April 21, 1931.   G. F. COLBERT ET AL   1,802,169
ORNAMENTAL COMPOSITE GLASS
Filed Jan. 10, 1930

INVENTORS

Patented Apr. 21, 1931

1,802,169

UNITED STATES PATENT OFFICE

GEORGE F. COLBERT AND WILLIAM H. COLBERT, OF PITTSBURGH, PENNSYLVANIA, ASSIGNORS TO LIBERTY MIRROR WORKS, A CORPORATION OF PENNSYLVANIA

ORNAMENTAL COMPOSITE GLASS

Application filed January 10, 1930. Serial No. 419,808.

Figure 1:
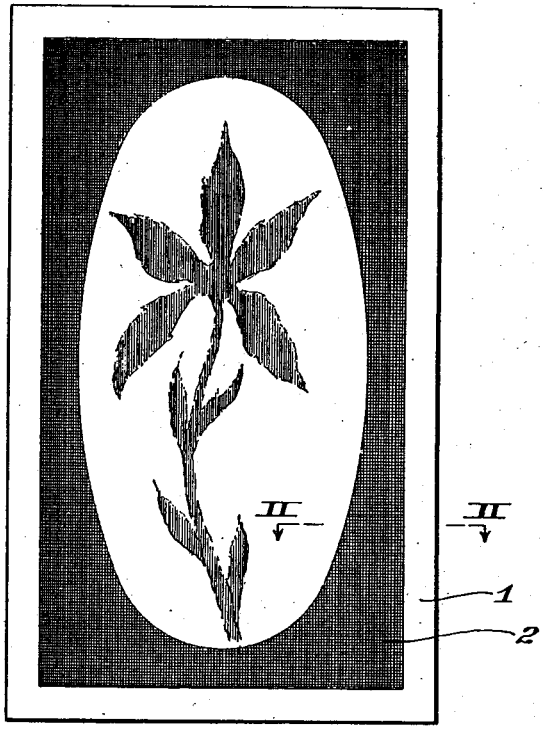
Figure 1:
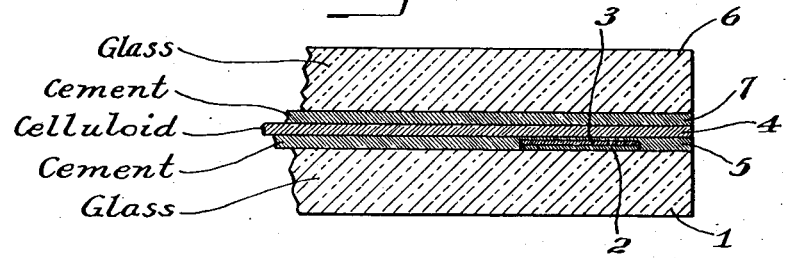
Figure 1:
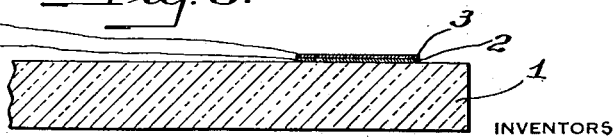

The invention relates to composite glass, and has for its objects the provision of glass of this type having an improved ornamental appearance fitting it for use wherever opaque or translucent flat glass can be used, as for instance in architectural paneling, desk and table tops, plaques and in base plates for fountain pen and ink well sets and the like. In making the glass, the method employed for securing an ornamental pattern of metallic composition on one of the glass sheets is preferably that set forth in our application, Serial Number 305,507. After the glass sheet is so ornamented, it is backed up with a sheet of pyroxylin plastic, such as celluloid, of a color contrasting to that of the metallic film on the glass, and composited with a second glass sheet in the usual way, a layer of cement being interposed between the surfaces of the celluloid sheet and those of the glass sheets. One embodiment of the invention is illustrated in the accompanying drawings, wherein:

Figure 1 is a face view of a panel of composite glass. Fig. 2 is a section on the line II—II of Fig. 1, the films of material shown in this figure (and Fig. 3) being much exaggerated for the purposes of clear illustration. And Fig. 3 is a section through the edge of the front sheet of glass on the line II—II, after such sheet has been ornamented with a metallic film preparatory to compositing.

Referring to the drawings, 1 is the front sheet of glass in the composite plate, or panel having on its rear face the metallic film 2 in the form of an ornamental pattern; 3 is a film of protecting material (such as a sensitized varnish) lying over the metallic film and coextensive therewith; 4 is a thin sheet of celluloid of a color contrasting to that of the metallic film 2 and secured to the glass sheet 1 by the layer of cement 5; and 6 is a second sheet of glass secured to the celluloid sheet by the layer of cement 7.

The first step in the operation is the production on the back of the glass sheet 1 of the metallic film 2 of ornamental design. This is done by any one of the methods set forth in our application heretofore referred to. Any desired metallic film may be deposited depending upon the effect desired, such as gold, silver or lead sulphide. After the film is deposited over one of the surfaces of the sheet, such film is covered with a film of sensitized varnish and the desired design or picture is applied to the film by the projection of an illuminated image thereon. The film is then developed, so that the light treated portions which have been rendered insoluble remain, and the other portions of the film are removed. The plate is not treated with acid or other solvent to remove the unprotected portions of the metallic film. The glass sheet now has on its surface the pattern 2 of metallic composition covered by the protecting coating 3 consisting of the insoluble portions of the varnish film.

After rinsing the sheet 1 with water and drying it, the compositing of this sheet with the celluloid sheet 4 and glass sheet 6 is carried on in the usual way known in the art. That is, the inner surfaces of the glass sheets 1 and 6 are coated with layers of cement 5 and 7 (preferably gelatin), the celluloid sheet 4 of a color contrasting to that of the metallic film 2 forming the pattern is placed between the glass sheets and the sandwich thus formed is exposed to heat and pressure. This gives a plate of highly ornamental appearance, the pattern 2 of metallic composition being outlined by the background supplied by the celluloid of contrasting color which shows through the area of the sheet 1 which is not covered by the pattern.

Several methods of producing the ornamental pattern of metallic composition are set forth in our application heretofore referred to, and any of these methods may be used, but the projection method, as above described is preferred, as this gives a very thin protecting film 3 which is desirable from a compositing standpoint. The films 2, 3, 5 and 7 are shown relatively thick for the purpose of clear illustration, but as a matter of fact, all of these films are so thin, as to be difficult of measurement, probably from one to three or four hundred thousandths of an inch. In some cases, the sheets 4 and 6 may be replaced by a sheet or sheets of other material, such as marble, onyx, or the like, to give the necessary reinforcing and thickness, or additional sheets or plates may be cemented to the particular composite plate illustrated to meet special requirement or give certain effects, the invention contemplating the use of backing means of various kinds and of various thicknesses. The only requirements are that the backing shall perform the functions of reinforcing the ornamented sheet and protecting it and, at the same time, give the contrasting color necessary as a background for the metallic pattern.

What we claim is:

1. An ornamental composite plate comprising a transparent sheet of glass having on one surface a deposited metallic film partly covering said surface and constituting an ornamental pattern, and a reinforcing backing of hard impervious material coextensive in area with said glass sheet cemented to the rear surface thereof and of a color contrasting to that of the film.

2. An ornamental composite plate comprising a transparent sheet of glass having on one surface a deposited metallic film partly covering said surface and constituting an ornamental pattern, and a reinforcing backing of hard impervious material coextensive in area with said glass sheet cemented to the rear surface thereof and of a color contrasting to that of the film, said backing comprising sheets of pyroxylin plastic and glass cemented together with the sheet of plastic next to said transparent sheet of glass.

3. An ornamental composite plate comprising a transparent sheet of glass having on one surface a deposited metallic film partly covering said surface and constituting an ornamental pattern, a sheet of pyroxylin plastic of a color contrasting to that of the film secured to said surface, and a sheet of hard impervious material secured to the rear surface of the sheet of plastic.

4. An ornamental composite plate comprising a transparent sheet of glass having on one surface a deposited metallic film partly covering said surface and constituting an ornamental pattern, a film protecting material lying over said metallic film, a sheet of tough reinforcing material of a color contrasting to that of the metallic film back of said surface, and a layer of cement interposed between the glass sheet and the sheet of tough material and serving to secure them together.

5. An ornamental composite plate comprising a transparent sheet of glass having on one surface a deposited metallic film partly covering said surface and constituting an ornamental pattern, a sheet of pyroxylin plastic of a color contrasting to that of the film in opposition to said surface, a layer of cement between the opposing surfaces of the two sheets, and a sheet of hard impervious material secured to the rear surface of the sheet of plastic.

6. An ornamental composite plate comprising a transparent sheet of glass having on one surface a deposited metallic film partly covering said surface and constituting an ornamental pattern, a sheet of pyroxylin plastic of a color contrasting to that of the film in opposition to said surface, a layer of cement between the opposing surfaces of the two sheets, and a second glass sheet cemented to the rear surface of the sheet of plastic.

In testimony whereof, we have hereunto subscribed our names.

GEORGE F. COLBERT.
WILLIAM H. COLBERT.